Aug. 31, 1926.
G. H. HUFFERD
VEHICLE FRAME STRUCTURE
Filed Feb. 26, 1926
1,597,977
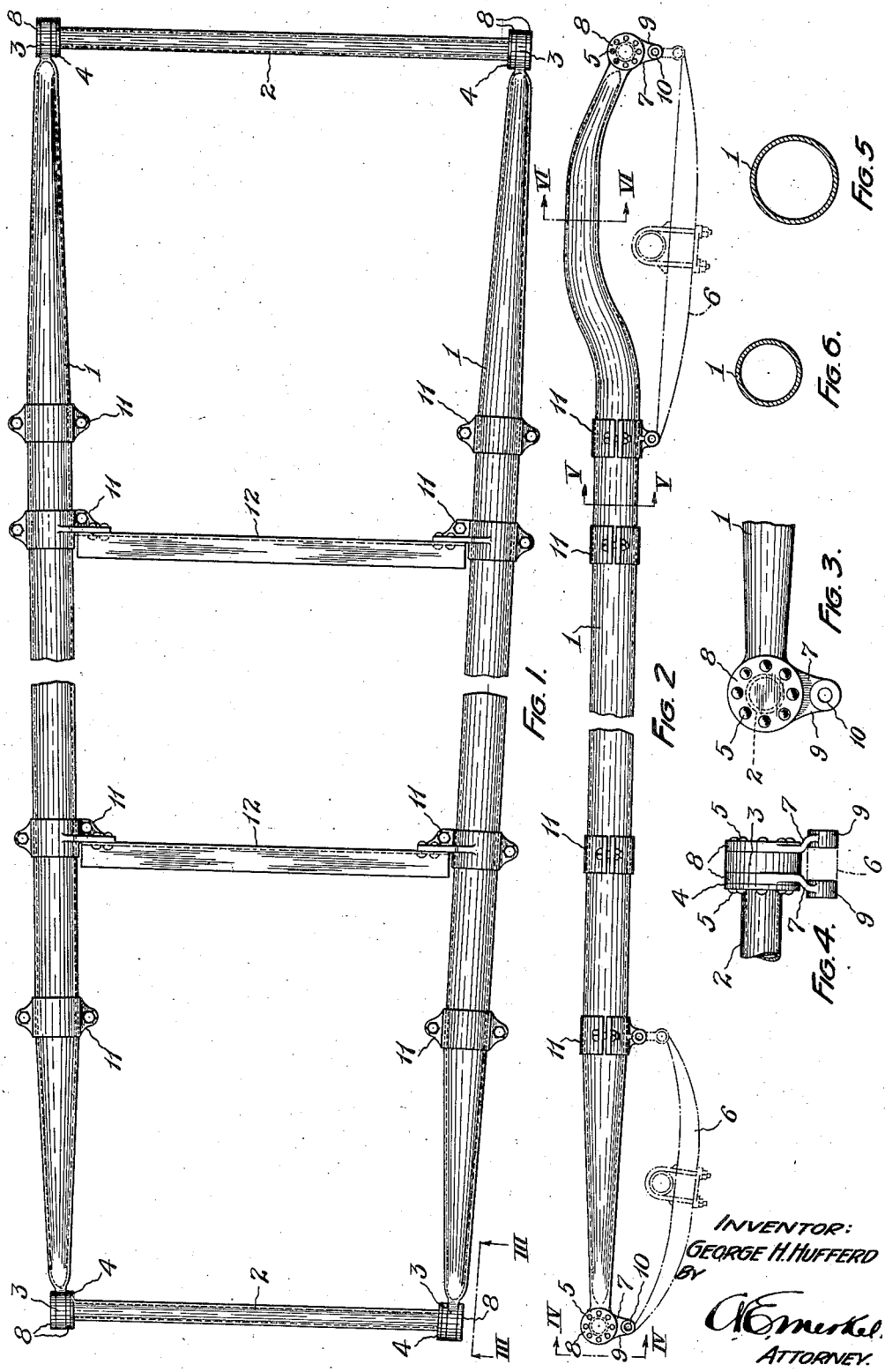

Patented Aug. 31, 1926.

1,597,977

UNITED STATES PATENT OFFICE.

GEORGE H. HUFFERD, OF DETROIT, MICHIGAN, ASSIGNOR TO THOMPSON PRODUCTS INC., OF CLEVELAND, OHIO, A CORPORATION OF OHIO.

VEHICLE FRAME STRUCTURE.

Application filed February 26, 1926. Serial No. 90,842.

The invention relates to frame structures such as are adapted for use in automobiles. As ordinarily constructed such frames are made from structural shapes, e. g., from channel bars, and, in order to withstand strains tending to distort them, are made from heavy material. It is desirable to have such frames as light as possible. It is shown that, for the same weight, a tubular part will much better resist distortion than a part of other cross section, and it is therefore obvious that a frame designed for a given situation might be made lighter by employing tubular parts. But heretofore no effective and economical way has been found whereby a light tubular part may be provided with a portion sufficiently rugged to serve as a connecting means to another part.

It is therefore the object of this invention to decrease the weight of automobile frames and the like, or to secure more resistance to distortion thereof with a given weight.

This object is accomplished by employing tubular members for the frame, the side members having substantially solid, integral, flattened end portions, which serve as means for connection with the ends of the cross members.

In the annexed drawings:

Figure 1 is a plan view of a complete automobile frame made in accordance with my invention.

Fig. 2 is a side elevation of the frame shown in Fig. 1, the springs and mountings for the front and rear being shown in dot and dash lines;

Fig. 3 is an enlarged view of one end of the frame shown in Fig. 2;

Fig. 4 is a front elevation of Fig. 3;

Fig. 5 is a cross section on line V—V of Fig. 2; and

Fig. 6 is a cross section on line VI—VI of Fig. 2.

Referring to the drawings in detail, in which the same reference numeral designates the same part throughout, the frame is composed of side members 1 and cross bars 2, which connect the ends of the side members. Each side member 1 is composed of a light, or thin-walled, seamless metal tube, having substantially solid, integral, flattened end portions, indicated at 3. Such a part, and the method of constructing it, are not now known to the art, the process of making it forming the subject matter of a copending application, and it will be here described in sufficient detail to enable one to practice the present invention.

A piece of seamless tubular metal stock is selected of a length to form a side bar 1 when the operations thereon, now to be detailed, are completed. The wall of the tube should be as thin as possible to withstand the distortion strains to which the completed part will be subjected in use. The end of this tube is subject to a series of upsetting operations whereby the wall of the tube is increased in thickness inwardly, that is, the metal of the wall is caused to flow inwardly while the outside diameter remains the same. After such upsetting operations the end of the tube so upset is flattened to form the substantially solid portion 3 indicated in the drawings. Upsetting the end of a tube is an operation known to the art, and consists in subjecting the part to endwise pressure while in a heated condition and while confined between suitable dies with a sufficient cavity formed by the adjacent die surfaces to permit the hot metal when subjected to such pressure, to flow and fill the die cavity. It is also known that there is a limit to the amount of metal which may be upset at one operation, and it is therefore necessary to repeat the upsetting operation successively in dies of varying form until the desired thickness of metal has been upset. The thickened portion is then flattened by a simple forging operation.

As a convenient means for attaching the tubular cross bar 2 to the flattened portion 3 of the side member, I provide an outwardly projecting flange 4 on the end of the cross bar, having a plurality of apertures to receive rivets or bolts 5 passing through the end of the side member.

In the particular application herein disclosed it is necessary to provide means to serve as a connection for the rear end of a spring 6, and for this purpose I employ a pivot or trunnion bracket 7 preferably consisting of a circular, flattened upper end 8 provided with a plurality of apertures to receive the rivets 5, with a depending reduced portion 9 having openings 10 serving as a bearing for a bolt upon which the rear end of the spring 6 is pivoted.

The frame so constituted by two side members and two cross bars is sufficient to withstand the distortion strains encountered in automobile use, thereby dispensing with other means commonly employed for this purpose. Suitable brackets such as indicated at 11 may be secured to the side members to serve as connecting means for the front and rear springs and for cross bars 12 adapted to support other parts of an automobile.

It will be apparent from the above description that I have provided a frame of very light construction, capable of greater resistance to distortion for a given weight than frames commonly employed, which may be constructed from tubular stock found in the market at a low manufacturing cost, and that it attains the objects above indicated in an efficient and economical manner.

The specific embodiment disclosed may be varied in detail and it is therefore to be understood that my invention is not confined to the details described but includes all forms comprehended within the terms of the appended claims.

What I claim is:

1. A frame for automobiles and the like comprising tubular side members having integral, substantially solid, flattened ends, and tubular cross bars connecting the opposed flattened ends.

2. The combination specified in claim 1 with the addition of spring supporting brackets connected with the flattened ends of the side members.

3. A frame for automobiles and the like comprising tubular side members having integral, substantially solid, flattened ends, tubular cross bars and spring supporting brackets, and means for rigidly securing together the flattened ends of the side members, the ends of the cross bars, and the spring supporting brackets.

4. A frame for automobiles or the like comprising tubular side members having integral, substantially solid, flattened ends, tubular cross bars having integral flanged ends, and means for rigidly securing the flanged ends of the cross members to the flattened ends of the side members.

5. The combination specified in claim 4 with the addition of a depending spring bracket included in the joint between the flattened ends of the side members and the ends of the cross bars and having a pivot bearing at its lower end.

Signed by me this 22nd day of January, 1926.

GEO. H. HUFFERD.